United States Patent [19]

Goldwasser et al.

[11] Patent Number: 4,567,236

[45] Date of Patent: Jan. 28, 1986

[54] NOVEL POLYMER BLENDS

[75] Inventors: David J. Goldwasser, Cheshire; Richard W. Oertel, III, Guilford, both of Conn.

[73] Assignee: The Upjohn Co., Midland, Mich.

[21] Appl. No.: 514,414

[22] Filed: Jul. 18, 1983

[51] Int. Cl.$^4$ .......................... C08F 8/30; C08L 75/00
[52] U.S. Cl. .................................................. 525/127
[58] Field of Search ......................................... 525/127

[56] References Cited

U.S. PATENT DOCUMENTS

| | | | |
|---|---|---|---|
| 4,076,660 | 2/1978 | Olstowski et al. | 260/9 |
| 4,076,679 | 2/1978 | Turner | 260/31.2 N |
| 4,261,946 | 4/1981 | Goyert et al. | 264/211 |
| 4,317,890 | 3/1982 | Goyert et al. | 525/127 |
| 4,342,847 | 8/1982 | Goyert et al. | 525/66 |
| 4,376,834 | 3/1983 | Goldwasser et al. | 521/159 |

*Primary Examiner*—Lewis T. Jacobs
*Assistant Examiner*—A. L. Carrillo
*Attorney, Agent, or Firm*—James S. Rose

[57] ABSTRACT

Blends are disclosed of a clear polyurethane plastic and a minor amount (up to 30 parts by weight per 100 parts by weight of blend) of an incompatible polymeric impact modifier. The resulting blends exhibit properties (high impact resistance, high flexural modulus and resistance to heat) comparable to those of engineering plastics such as nylon.

8 Claims, No Drawings

NOVEL POLYMER BLENDS

BACKGROUND OF THE INVENTION

1. Field of the Invention

This invention relates to polyurethane resins and is more particularly concerned with blends of polyurethane resins containing a minor amount of a second polymer which is incompatible therewith.

2. Description of the Prior Art

Clear polyurethane resins, produced by reaction of an organic polyisocyanate and a low molecular weight active hydrogen containing compound such as an aliphatic glycol, have been known in the art for a considerable time; see, for example, O. Bayer, Angewandte Chemie, 59, No. 9 at pp 255–288, September 1947. These materials are rigid and relatively brittle, i.e. they demonstrate a low order of impact resistance when tested in accordance with standard tests such as the Notched Izod impact test (ASTM D256-56). Accordingly, they have found relatively little application in the fabrication of structural components such as automobile body parts, equipment housings, mechanical goods and the like.

Various methods for modifying the properties of such resins have been suggested. Illustratively, U.S. Pat. No. 4,076,660 describes the production of rapid-setting rigid polyurethanes by reacting an organic polyisocyanate, an aliphatic monomeric triol and a low molecular weight propylene glycol derivative in the presence of a modifier which is a liquid carboxylic acid ester. The resulting products are said to be moldable by casting to form machine parts and the like. U.S. Pat. No. 4,076,679 shows making similar compositions but using, as the modifier which is incorporated into the polyurethane-forming reaction mixture, a polymer derived from one or more ethylenically unsaturated monomers which polymer is in the form of a liquid or a grease meeting certain specifications.

U.S. Pat. No. 4,342,847 describes a process for the preparation of thermoplastic materials by introducing a thermoplastic polymer into an extruder at a first inlet at a temperature such that the polymer melts and then adding polyurethane forming reactants through a second inlet. The blend of the thermoplastic polymer and the polyurethane is discharged from the extruder in finished form. The resulting polymer blend is said to possess high impact resistance. Examples 1(a), (b) and (c) and 2(b) of the reference show the use of an ABS polymer as the thermoplastic polymer and butanediol and various diisocyanates (but no polyol) as the polyurethane forming reactants. The minimum amount of ABS polymer used in these various Examples is 39.3 percent by weight based on total weight of the ABS polymer and the polyurethane. Example 2(d) serves to demonstrate that the high impact proporties are not achieved if the polyurethane is formed first and the thermoplastic polymer is added later.

It has now been found that polymers having properties comparable to those of engineering plastics such as nylon and the recently reported polyurethanes of U.S. Pat. No. 4,376,834, can be obtained by blending a clear polyurethane plastic with a minor amount of certain impact modifiers which are incompatible with the polyurethane.

SUMMARY OF THE INVENTION

This invention comprises polymer blends which are characterized by high impact resistance, high flexural modulus and a heat deflection temperature of at least 50° C. at 264 psi and which comprise a blend of:

(a) from 3 to 30 parts by weight, per 100 parts by weight of said blend, of a polymeric impact modifier which is incompatible with the major component of the blend; and, as the balance of said blend, (b) a clear polyurethane plastic which comprises the product of reaction of:

(i) an organic polyisocyanate;

(ii) at least one chain extender having a functionality from 2 to 3 and a molecular weight from about 50 to about 400; and (iii) from 0 to 25 parts by weight, per 100 parts of total polyurethane reactants, of a polyol having a functionality of at least 1.9 and a molecular weight of at least 500, which polyol gives rise to soft polymer segments which are compatible with the remainder of the polymer matrix;

the proportions of said components (i), (ii) and (iii) being such that the overall ratio of isocyanate groups to active hydrogen groups is in the range of 0.95:1 and to about 1.05:1.

By the term "high impact resistance" is meant an impact strength at ambient conditions (circa 20° C.) of at least 3 ft. lbs. per inch of notch as measured by the Notched Izod test, supra.

The "heat deflection temperature" is a measure of the resistance of the polymer to deformation by heat and is the temperature (in °C.) at which deformation of a test sample of the polyurethane of predetermined size and shape occurs when subjected to a flexural load of a stated amount (e.g. 264 psi). All such temperatures recorded herein were obtained using the procedure of ASTM D648-56.

The term "high flexural modulus" means a flexural modulus under ambient conditions (see above) of at least about 150,000 psi as measured by ASTM D790.

DETAILED DESCRIPTION OF THE INVENTION

The polymer blends of the invention are prepared readily by admixture of the individual preformed components (a) and (b) in any convenient manner. Illustratively, the polyurethane component (a) can be prepared in finished form and then admixed, preferably in a comminuted form such as powder, pellets and the like, with the impact modifier component (a) also preferably in comminuted form. The resulting mixture is homogenized, if desired, by conventional means such as by extrusion and like processes.

The polymer blends of the invention can also be prepared by incorporating the impact modifier (a) into the reaction mixture which is used to prepare the polyurethane resin component (b). The incorporation is accomplished by adding the impact modifier to all the other reactants as they are being brought together and mixed. Alternatively, the impact modifier is preblended with one or other of the reactants and the dispersion of the impact modifier in said reactant or reactants is then added to the rest of the reactants. Where the polyurethane resin is being prepared using a continuous twin-screw reactor extruder or like apparatus which can be utilized in a continuous process, the impact modifier (a) is conveniently added to the reaction mixture by introducing it, on a continuous basis and in the appropriate proportion, through an inlet port of the apparatus at the same time as the other reactants are being continuously fed thereto. The impact modifier (a) can also be introduced into the continuous reactor as a blend with the polyol components.

The proportions in which the impact modifier (a) and the polyurethane resin component (b) are admixed are advantageously such that the weight percent of the impact modifier in the resulting blend is in the range of about 3 to about 30 percent. Preferably the proportions are such that the impact modifier is present in the resulting blend in a proportion of about 4 to about 25 percent by weight, and, most preferably, in the proportion of about 5 to about 20 percent by weight.

The impact modifier (a) can be any of the polymers known in the art as impact modifiers. A particularly useful group of such modifiers comprises those which have been conventionally employed in the art to impart improved impact properties to polyvinyl chloride and related polymers; see, for example, Encyclopedia of Polymer Science and Technology, Vol. 14, p. 417–418, 1971, Interscience Publishers, New York. A preferred group of impact improvers are the particulate rubbery impact modifiers. Illustrative of such modifiers are acrylonitrile-butadiene-styrene terpolymers, methyl methacrylatebutadiene-styrene terpolymers, chlorinated polyethylenes, ethylene-vinyl acetate copolymers, vinyl chloride-ethylenevinyl acetate graft polymers, polyethylene, copolymers of vinyl chloride with octyl acrylate or octyl fumarate, poly(alkyl acrylates), and the like. A particularly preferred group of impact modifiers for use in the blends of the invention is inclusive of multi-phase composite interpolymers based on poly(alkyl acrylates), methacrylate-butadiene-styrene copolymer rubbers and acrylonitrile-butadiene-styrene copolymer rubbers.

The polyurethane resin component (b), employed in the preparation of the polymer blends of the invention, can be prepared by any of the methods currently employed in the art using the reactants and proportions set forth above. Preferably the polyurethanes are made by the one-shot procedure and less preferably by the prepolymer method. In the case of the one-shot procedure the extender component (ii) and the polyol component (iii), if the latter is employed, are preblended and fed to the reaction vessel as a single component. The mixing of the reactants can be accomplished by any of the procedures and apparatus conventional in the art. Preferably, the individual components are rendered substantially free from the presence of extraneous moisture using conventional procedures, for example by heating under reduced pressure at a temperature above the boiling point of water at the pressure employed. The mixing of the reactants can be carried out at ambient temperature (i.e. of the order of 20° to 25° C.) and the resulting mixture is then generally heated to a temperature of the order of about 40° C. to about 130° C. preferably to a temperature of about 50° C. to about 100° C. Advantageously and preferably, one or more of the reactants is preheated to a temperature within the above ranges before the admixing is carried out. Advantageously, in a batch procedure, the heated reaction components, prior to admixture, are subjected to degassing in order to remove entrained bubbles of air or other gases before the reaction takes place. This is accomplished conveniently by reducing the pressure under which the components are maintained until no further evolution of bubbles occurs. The degassed reaction components are then admixed and transferred to suitable molds, extruders, flexible belts and the like and allowed to cure at temperatures of the order of ambient temperature to about 250° C. Pressure may also be applied during the curing reaction. The time required for curing will vary according to the temperature of curing and also with the nature of the particular composition. The time required in any given case can be determined by a process of trial and error.

It is frequently desirable, but not essential, to include a catalyst in the reaction mixture employed to prepare the compositions of the invention. Any of the catalysts conventionally employed in the art to catalyze the reaction of an isocyanate with a reactive hydrogen containing compound can be employed for this purpose. A detailed listing of such catalysts is to be found, for example, in U.S. Pat. No. 4,202,957 at Column 5, lines 45 to 67. This disclosure is incorporated herein specifically by reference. The amount of catalyst employed is generally within the range of about 0.02 to about 2.0 percent by weight based on the total weight of the reactants.

In a particular embodiment of the one-shot procedure the reaction is carried out on a continuous basis using apparatus and procedures such as that which is disclosed in U.S. Pat. No. 3,642,964.

The less preferred prepolymer method of preparing the polyurethane component of the blends of the invention can be employed when a polyol component (iii) is present. In this method the polyisocyanate and polyol are reacted in a first step and the isocyanate-terminated prepolymer is subsequently reacted with the extender component (ii). The procedures employed can be any of those well-known in the art.

Any of the organic diisocyanates and polyisocyanates previously employed in the preparation of polyurethanes can be employed in preparing the compositions of the invention. Illustrative of such isocyanates are: methylenebis(phenyl isocyanate) including the 4,4'-isomer, the 2,4'-isomer and mixtures thereof, m- and p-phenylene diisocyanates, chlorophenylene diisocyanates, $\alpha,\alpha'$-xylylene diisocyanate, 2,4- and 2,6-toluene diisocyanate and the mixtures of these latter two isomers which are available commercially, tolidine diisocyanate, hexamethylene diisocyanate, 1,5-naphthalene diisocyanate, isophorone diisocyanate, and methylenebis(cyclohexyl isocyanate) including the 4,4'-isomer, the 2,4'-isomer and mixtures thereof. Preferably the organic polyisocyanate employed in the invention is methylenebis(phenyl isocyanate), in the form of the 4,4'-isomer as well as mixtures of the 4,4'-isomer with amounts (up to about 70 percent by weight) of the 2,4'-isomer, and modified forms of this diisocyanate. By the latter are meant those forms of methylenebis(phenyl isocyanate) which have been treated to render them stable liquids at ambient temperature (circa 20° C.). Such products include those which have been reacted with a minor amount (up to about 0.2 equivalents per equivalent of polyisocyanate) of an aliphatic glycol or a mixture of aliphatic glycols such as the modified methylenebis(phenyl isocyanates) described in U.S. Pat. Nos. 3,394,164; 3,644,457; 3,883,571; 4,031,026; 4,115,429; 4,118,411; and 4,299,347.

The modified methylenebis(phenyl isocyanates) also include those which have been treated so as to convert a minor proportion of the diisocyanate to the corresponding carbodiimide which then interacts with further diisocyanate to form uretone-imine groups, the resulting product being a stable liquid at ambient temperatures as described, for example, in U.S. Pat. No. 3,384,653. Mixtures of any of the above-named polyisocyanates can be employed if desired. Further, in the case of the preparation of those polyurethanes of the invention which are thermoset, it is possible to introduce into the polyisocyanate component employed in the reaction minor amounts (up to about 30 percent by weight) of polymethylene polyphenyl polyisocyanates. The latter are mixtures containing from about 20 to 90 percent by weight of methylenebis(phenyl isocyanate) the remainder of the mixture being polymethylene polyphenyl polyisocyanates of functionality higher than 2.0. Such polyisocyanates and methods for their preparation are well-known in the art; see, for example, U.S. Pat. Nos. 2,683,730; 2,950,263; 3,012,008 and 3,097,191. These polyisocyanates are also available in various modified forms. One such form comprises a polymethylene polyphenyl polyisocyanate as above which has been subjected to heat treatment, generally at temperatures from about 150° C. to about 300° C., until the viscosity (at 25° C.) has been increased to a value within the range of about 800 to 1500 centipoises. Another modified polymethylene polyphenyl polyisocyanate is one which has been treated with minor amounts of an epoxide to reduce the acidity thereof in accordance with U.S. Pat. No. 3,793,362.

The component (ii) which is employed in preparing the polyurethane plastic (b) can be any of the chain extenders known in the art which have a functionality from about 2 to about 3 and a molecular weight in the range of from about 50 to about 400. Illustrative of such extenders are aliphatic straight and branched chain diols, including cyclo-aliphatic diols, preferably having from about 2 to 8 carbon atoms, inclusive, in the chain. Illustrative of such diols are ethylene glycol, 1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methylpentane-1,5-diol, 1,4-cyclohexanedimethanol, and the like including mixtures of two or more such diols. The extenders, which can be used alone or in admixture with each other or any of the above diols, also include diethylene glycol, dipropylene glycol, tripropylene glycol, ethanolamine, N-methyl-diethanolamine, N-ethyl-diethanolamine, and the like, as well as ester diols obtained by esterifying adipic, azelaic, glutaric and like aliphatic dicarboxylic acids with aliphatic diols such as those exemplified above utilizing from about 0.01 to about 0.8 mole of acid per mole of diol. Also included in the extenders which can be used in preparing the polyurethanes of the invention are the adducts obtained by reacting an aliphatic diol or triol such as 1,4-cyclohexanedimethanol, neopentyl glycol, hexane-1,2-diol, ethylene glycol, butane-1,4-diol, trimethylolpropane and the like with ε-caprolactone in a mole ratio of from 0.01 to 2 moles of caprolactone per mole of diol or triol. Trifunctional extenders such as glycerol, trimethylolpropane and the like can also be employed alone or in admixture with one or more of the above diols.

While any of the diol extenders described and exemplified above can be employed alone, or in admixture, it is preferred to use 1,4-butanediol, neopentyl glycol, 1,4-cyclohexanedimethanol, ethylene glycol, and diethylene glycol, either alone or in admixture with each other or with one or more aliphatic diols previously named. A particularly preferred diol is 1,6-hexanediol either as the sole extender or in combination with one or more of the above-named group.

The polyol component (iii) which is optionally present in the polyurethanes employed in the blends of the invention can be any of the polyols which are conventionally employed in the manufacture of clear polyurethane plastics, i.e. are compatible with other components of the reaction mixture and, in the amounts employed as discussed below, do not give rise to soft polymer segments which separate out as a dispersed phase in the polymer matrix. [The compositions disclosed in the aforesaid U.S. Pat. No. 4,376,834 have two phase morphology, the polyols there used giving rise to soft segments which are incompatible with remainder of the polymer matrix.] Illustrative of polyols which can be employed in the present invention, and which have functionalities of at least 1.9 and preferably 1.9 to 3.0, are polyester polyols having a molecular weight of about 500 to about 6000, polytetramethylene glycols having a molecular weight of about 500 to about 1200 and random and block copolymers of ethylene oxide and propylene oxide having an ethylene oxide content of at least about 30 percent by weight and a molecular weight in the range of about 500 to about 2500. The polyester polyols are inclusive of those prepared by polymerizing ε-caprolactone using an initiator such as ethylene glycol, ethanolamine and the like and those prepared by esterification of polycarboxylic acids such as phthalic, terephtalic, succinic, glutaric, adipic, azelaic and the like acids with polyhydric alcohols such as ethylene glycol, butanediol, glycerol, trimethylolpropane, 1,2,6-hexanetriol, cyclohexanedimethanol and the like.

While not wishing to be bound by such a theory, it is believed, by way of explanation, that the presence of the above polyol is only necessary when the corresponding polyurethane prepared from a particular polyisocyanate and an extender diol alone is difficult to process (by extrusion and like procedures) in the preparation of the blends of the invention. Thus, when a polyol is employed it is preferred that it be used in the minimum amount necessary to overcome the aforesaid processing difficulties. The amount necessary to achieve this result varies according to the particular combination of polyisocyanate and extender diol being employed. The precise amount to use in any given instance can be determined readily by trial and error. The role of the polyol is essentially that of a plasticiser.

The polymer blends of the invention are opaque in direct contrast to the clear, transparent appearance of the polyurethane components from which the blends are prepared. The opaqueness is believed due to the fact that the impact modifier is present as a separate phase which is dispersed in the polyurethane plastic from which the blends are prepared. In other words, the polymer blends of the invention exhibit a typical two phase morphology.

The polymer blends of the invention can also have incorporated therein any of the various additives such as fillers, antioxidants, pigments, fire retardants, plasticisers, reinforcing agents and the like which are commonly employed in the art in such compositions.

The compositions of the invention can be fabricated in any desired configuration for use as automobile body parts, equipment housings, mechanical goods, gears, gaskets and a wide variety of other such articles which require the high impact resistance and other properties possessed by the polyurethanes of the invention. The methods of fabrication can be any of those known in the art of molding thermoplastic or thermoset polyurethanes. Such methods include reaction injection molding, cast molding in the case of thermosets and injection molding, extrusion, blow molding, calendering, thermoforming and the like in the case of thermoplastics. The marked resistance of the blends of the invention to decomposition upon exposure to temperatures involved in melt processing greatly facilitates the fabrication of articles from the thermoplastic compositions of the invention.

The following examples describe the manner and process of making and using the invention and set forth the best mode contemplated by the inventors of carrying out the invention but are not to be construed as limiting.

EXAMPLE 1

A clear polyurethane resin (Resin A) was prepared from the reactants and quantities set forth in TABLE I below and employing the following procedure.

The glycol was dried by heating under vacuum for 2 hr. at 80°–100° C. The dried product was cooled to circa 70° C. and the diisocyanate (molten), antioxidant, wax lubricant and catalyst were added thereto with manual stirring. The resulting mixture was stirred manually for about 30–60 seconds and then poured on to an open tray which had been previously coated with a release agent. The cast product solidified and was allowed to cool to room temperature (circa 20° C.) before being chopped mechanically into relatively small pieces. The chopped material was dried by heating at 90°–110° C. in a dehumidifying drier overnight.

TABLE I

| | Resin A |
|---|---|
| 4,4'-methylenebis-(phenyl isocyanate) | 500 g. (2 mole) |
| 1,6-hexanediol | 239.6 g. (2.03 mole) |
| antioxidant | 1 |
| wax lubricant | 1 |
| [1]T-10 catalyst | 0.05 g. |
| NCO/OH | 0.985 |

[1]50% stannous octoate in dioctylphthalate; M and T Chemical.

An aliquot of the above Resin was then taken and used to form a blend with Acryloid KM-330 [an impact modifier believed to be poly(butylacrylate): Rohm and Haas Inc. Bulletin MR-108: January 1980]. The latter material had been pelletized, prior to use, by extrusion in the form of a strand using a C. W. Brabender $\frac{3}{4}$" single screw extruder followed by cooling of the strand and chopping thereof using a mechanical pelletiser. The blend was prepared by taking 85 parts by weight of the chopped clear polyurethane glass and 15 parts by weight of the pelletized impact modifier, shaking the two components together in a plastic bag and then melt extruding the mixture using a C. W. Brabender twin screw extruder Model TSM-79 with a barrel temperature of 225° C. The extruded strand was cooled in air, mechanically chopped into small pieces, then dried overnight in a dehumidifying drier at 90°–110° C. Test sheets (6"×3"×$\frac{1}{8}$") were prepared by injection molding from the blend so derived and flex bars were cut from these sheets. The various test bars were kept at ambient temperature (circa 20° C.) for at least 24 hrs. and then subjected to testing for Notched Izod impact resistance (ASTM D256-56), flexural modulus (ASTM D790), heat deflection temperature (ASTM D648) and glass transition temperature (Tg) (measured by differential scanning calorimetry). Corresponding tests were also carried out using test bars prepared and cured in an identical manner from the starting Resin A. The test results are shown in TABLE II below.

TABLE II

| Test | Resin A | Resin A Blend |
|---|---|---|
| Notched Izod Impact; ft lb/in: $\frac{1}{8}$" | 0.58 | 17.3 |
| Flexural Strength: psi × 10³ | 14.8 | 10.7 |
| Flexural Modulus: psi × 10³ | 339 | 245 |
| Heat Deflection temp. @ 264 psi: °C. | 85 | 70 |
| Tg: °C. | | |
| First scan | 96 | 97 |
| Second scan | 94 | 95 |

It will be seen that the impact resistance of the blend was significantly greater than the unmodified Resin A. The introduction of the impact modifier into the blend did not seriously reduce the other properties of Resin A. The blend possessed properties which rendered it useful as a structural plastic.

EXAMPLE 2

Using the procedure described in Example 1 as a clear polyurethane resin was prepared from the following

| | Wt. (g) | Equivs. |
|---|---|---|
| 4,4'-methylenebis-(phenyl isocyanate) | 500 | 4.0 |
| *polycaprolactone diol (MW 2000) | 115.66 | 0.116 |
| 1,4-cyclohexanedimethanol | 274.02 | 3.8 |
| stannous octoate (50% solution in dioctylphthalate) | 0.05 | — |
| antioxidant | 1 | — |
| wax lubricant | 1 | — |

NCO/OH = 1.02
*13% w/w based on total reactants.

The resin so obtained (Resin B) was chopped mechanically into small pieces and the chopped material was dried by heating at 90°–110° C. in a dehumidifying drier overnight. Aliquots of the chopped resin and blends were prepared by taking 85 parts by weight of the resin and mixing with 15 parts by weight of Acryloid KM-330 as a powder (see Example 1) in the case of one aliquot and with 15 parts by weight of Hytrel 4056 pellets [polyester elastomer believed derived from terephthalic acid, 1,4-butanediol and polytetramethylene glycol: E. I. Du Pont De Nemours, Inc.] in the case of the other aliquot. The two mixtures were each shaken vigorously in a plastic bag and then subjected to extrusion using a C. W. Brabender twin screw extruder Model TSM-79 using a barrel temperature of 253°–257° C. at a screw speed of 15 rpm.

The extruded strands of the two blends were cooled in air, mechanically chopped into small pieces, and dried overnight in a dehumidifying drier at 85° C. Test sheets were prepared from the blends by injection molding and flex bars were cut from these sheets, post-cured for at least 24 hours at room temperature (circa 20° C.) and subjected to physical testing. An aliquot of the clear polyurethane resin (unblended) was also subjected to molding into test sheets and subjected to physical testing in an identical manner. The results of these tests are set forth in TABLE III below from which it will be seen that the introduction of the impact modifiers into the resin markedly improved the impact strength without detracting significantly from the other properties of the resin.

TABLE III

| Test | Resin B | Resin B + Acryloid KM-330 | Resin B + Hytrel 4056 |
|---|---|---|---|
| Notched Izod Impact: ft. lb/in ⅛" | 1.48 | 12.8 | 23.1 |
| Flexural Strength psi × 10³ | 16.3 | 12.6 | 13.6 |
| Flexural Modulus psi × 10³ | 370 | 297 | 312 |
| Heat Deflection temp. @ 264 psi: °C. | 83 | 84 | 82 |
| Tg: °C. | | | |
| first scan | 105 | — | 105 |
| second scan | 105 | — | 105 |

EXAMPLE 3

Using the procedure described in Example 1 a clear polyurethane resin was prepared in dried chopped form from the following reactants.

| | Wt. (g) | Equivs. |
|---|---|---|
| 4,4'-methylenebis-(phenyl isocyanate) | 500 | 4.0 |
| *polycaprolactone diol (MW 2000) | 39.94 | 0.04 |
| 1,6-hexanediol | 229.58 | 3.89 |
| stannous octoate solution | 0.05 | — |
| antioxidant | 1 | — |
| wax lubricant | 1 | — |

NCO/OH = 1.02
*4% w/w based on total reactants.

Aliquots of this resin (Resin C) were then used to prepare blends with four different impact modifiers namely Acryloid KM-330 (see Example 1), Acryloid KM-323B (an acrylic impact modifier: see Bulletin MR-94, January 1980 Rohm and Haas Inc.), Acryloid KM611 (methacrylate/butadiene/styrene terpolymer: Rohm and Haas Inc.) and Hytrel 4056 (see Example 2). In all cases the blends were made using 85 parts by weight of resin and 15 parts by weight of impact modifier (as a powder except for Hytrel 4056). The blends were prepared as described in Example 2 and test sheets were prepared as there described. The results of physical testing of the blends and of the unblended Resin C are set forth in TABLE IV. It will be seen that introduction of the impact modifier produced a marked increase in impact resistance of Resin C without detracting from any of the other properties.

TABLE IV

| Test | Resin C | Resin C + KM-330 | Resin C + KM-323B | Resin C + KM-611 | Resin C + Hytrel 4056 |
|---|---|---|---|---|---|
| Notched Izod Impact: ft. lbs/in ⅛" | 1.22 | 19.2 | 16.6 | *60% 13.1 *40% 4.5 | 22.8 |
| Flexural Strength psi × 10³ | 14.3 | 11.2 | 11.2 | 11.4 | 11.2 |

TABLE IV-continued

| Test | Resin C | Resin C + KM-330 | Resin C + KM-323B | Resin C + KM-611 | Resin C + Hytrel 4056 |
|---|---|---|---|---|---|
| Flexural Modulus psi × 10³ | 340 | 271 | 276 | 280 | 271 |
| Heat Deflection temp. @ 264 psi: °C. | 74 | 75 | 78 | 74 | 75 |
| Tg: °C. | | | | | |
| first scan | 93 | 88 | N.T. | N.T. | 88 |
| second scan | 89 | 87 | N.T. | N.T. | 87 |

*percent of total samples tested.

EXAMPLE 4

Using the procedure described in Example 1, a clear polyurethane resin was prepared in dried chopped form from the following reactants.

| | Wt. (g) | Equivs. |
|---|---|---|
| 4,4'-methylenebis-(phenyl isocyanate) | 500 | 4.0 |
| *polycaprolactone diol (MW 2000) | 30 | 0.03 |
| 1,6-hexanediol | 228.43 | 3.87 |
| decanol-1 | 3.61 | 0.02 |
| stannous octoate solution | 0.05 | — |
| wax lubricant | 1 | — |
| antioxidant | 1 | — |

NCO/OH = 1.02
*4% w/w based on total reactants.

An aliquot (85 parts by weight) of the resin so prepared (Resin D) was used to prepare a blend with Acryloid KM-330 powder (15 parts by weight) using the procedure described in Example 2. Test samples were prepared from the blend and from Resin D using the procedures set forth in Example 2 except that barrel temperatures of 246° C. were used at screw speeds of 20 rpm. The results of physical tests are shown in TABLE V from which it will be seen that the introduction of the modifier markedly increased the impact resistance of the Resin D without detracting significantly from the other properties of the resin.

TABLE V

| Test | Resin D | Resin D + KM-330 |
|---|---|---|
| Notched Izod Impact: ft. lbs/in ⅛" | 0.76 | 20.2 |
| Flexural Strength psi × 10³ | 14.1 | 10.9 |
| Flexural Modulus psi × 10³ | 333 | 267 |
| Heat Deflection temp. @ 264 psi: °C. | 77 | 73 |

EXAMPLE 5

Using the procedure described in Example 1 a clear polyurethane resin was prepared in dried chopped form using the following reactants.

| | Wt. (g) | Equivs. |
|---|---|---|
| 4,4'-methylenebis-(phenyl isocyanate) | 500 | 4.0 |
| polycaprolactone diol (MW 2000) | 30.74 | 0.03 |

|  | Wt. (g) | Equivs. |
|---|---|---|
| 1,6-hexanediol | 237.78 | 4.03 |
| stannous octoate solution | 0.05 | — |
| antioxidant | 1 | — |
| wax lubricant | 1 | — |

NCO/OH = 0.985

An aliquot (85 parts by weight) of the resin so prepared (Resin E) was used to prepare a blend with Acryloid KM-330 powder (15 parts by weight) using the procedure described in Example 1. Test samples were prepared from the blend and from Resin E using the procedures set forth in Example 1. The results of physical tests on the samples are shown in TABLE VI from which it will be seen that the introduction of the modifier markedly increased the impact resistance of Resin E without detracting significantly from the other properties of the resin.

TABLE VI

| Test | Resin E | Resin E + KM-330 |
|---|---|---|
| Notched Izod Impact: ft. lbs/in ⅛" | 1.08 | 19.1 |
| Flexural Strength psi × 10³ | 15.5 | 10.7 |
| Flexural Modulus psi × 10³ | 353 | 270 |
| Tg: °C. |  |  |
| first scan | 89 | 89 |
| second scan | 91 | 87 |
| Heat Deflection temp. @ 264 psi: °C. | 79 | 72 |

EXAMPLE 6

A second batch of Resin E was prepared exactly as described in Example 5 and aliquots of this batch were used to prepare blends with Acryloid KM-330 powder at two different levels, namely, 5 percent w/w and 10 percent w/w of the modifier in the blend. The method used to prepare the blends and the test samples from the blends was that described in Example 1. The results of the physical tests on the blends, together with identical tests on Resin E are shown in TABLE VII. It will be seen that the blend with the lower content of modifier showed an approximately 3-fold increase in impact strength and that with the higher content of modifier showed an approximately 15-fold increase in impact resistance compared with the starting Resin E.

TABLE VII

| Test | Resin E | Resin E 5% w/w KM-330 | Resin E 10% w/w KM-330 |
|---|---|---|---|
| Notched Izod Impact: ft. lb/in ⅛" | 1.08 | 3.02 | 16.1 |
| Flexural Strength psi × 10³ | 15.5 | 13.9 | 12.1 |
| Flexural Modulus psi × 10³ | 353 | 317 | 289 |
| Heat Deflection temp. @ 264 psi: °C. | 79 | 72 | 77 |

EXAMPLE 7

Using the procedure described in Example 1 a clear polyurethane resin was prepared in dried, chopped form using the following reactants.

|  | Wt. (g) | Equivs. |
|---|---|---|
| 4,4'-methylenebis(phenyl isocyanate) | 500 | 4 |
| polycaprolactone diol (M.W. 2000) | 28.81 | 0.03 |
| 1,4-butanediol | 130.72 | 2.90 |
| 1,6-hexandiol | 57.13 | 0.97 |
| decanol-1 | 3.61 | 0.02 |
| stannous octoate solution | 0.05 | — |
| wax lubricant | 1 | — |
| antioxidant | 1 | — |

NCO/OH = 1.02

An aliquot (85 parts by weight) of the resin so prepared (Resin F) was used to prepare a blend with Acryloid KM-330 powder (15 parts by weight) using the procedure described in Example 2. Test samples were prepared from the blend and from Resin F using the procedures set forth in Example 2. The results of physical tests on the samples are shown in TABLE VIII from which it will be seen that the introduction of the modifier markedly increased the impact resistance of Resin F without detracting significantly from the other properties of the resin.

TABLE VIII

| Test | Resin F | Resin F + KM-330 |
|---|---|---|
| Notched Izod Impact: ft. lbs/in ⅛" | 0.90 | 16.6 |
| Flexural Strength psi × 10³ | 16.0 | 12.0 |
| Flexural Modulus psi × 10³ | 381 | 312 |
| Heat Deflection temp. @ 264 psi: °C. | 77 | 82 |

We claim:
1. A polymer blend characterized by high impact resistance, high flexural modulus and a heat deflection temperature of at least 50° C. at 264 psi which comprises a blend of:
   (a) from 3 to 30 parts by weight, per 100 parts by weight of said blend, of a polymeric impact modifier which is incompatible with the major component of the blend and is a multiphase composite interpolymer based on a polyalkyl acrylate; and, as the balance of said blend,
   (b) a polyurethane glass which is the product of reaction of:
      (i) an organic polyisocyanate selected from the group consisting of 4,4'-methylenebis(phenyl isocyanate), mixtures of 4,4'-methylenebis(phenyl isocyanate) and 2,4'-methylenebis(phenyl isocyanate), and liquid forms of 4,4'-methylenebis(phenyl isocyanate);
      (ii) at least one aliphatic glycol chain extender having a molecular weight from about 50 to about 400;
      the proportions of said components (i), and (ii) being such that the overall ratio of isocyanate groups to active hydrogen groups is in the range of 0.95:1 to about 1.05:1.
2. A polymer blend according to claim 1 wherein said component (b) is a polyurethane glass prepared by reaction of 4,4'-methylenebis(phenyl isocyanate) and an aliphatic diol containing from 2 to 8 carbon atoms.
3. A polymer blend according to claim 1 wherein said component (a) is employed in an amount in the range of about 5 to about 20 percent by weight based on total weight of the blend.

4. A polymer blend according to claim 3 wherein said component (a) comprises a multi-phase composite interpolymer based on poly(butylacrylate).

5. A polymer blend characterized by high impact resistance, high flexural modulus and a heat deflection temperature of at least 50° C. to 264 psi which comprises a blend of:
 (a) from 3 to 30 percent by weight, per 100 parts by weight of said blend, of a polymeric impact modifier which is incompatible with the major component of the blend and is a multi-phase composite interpolymer based on poly(butylacrylate); and, as the balance of said blend;
 (b) a polyurethane glass which is the product of reaction of:
  (i) 4,4′-methylenebis(phenyl isocyanate);
  (ii) at least one aliphatic diol chain extender having 2 to 8 carbon atoms;
  the proportions of said components (i), and (ii) being such that the overall ratio of isocyanate to active hydrogen groups is in the range of 0.95:1 to about 1.05:1.

6. A polymer blend according to claim 5 wherein the component (a) is employed in an amount in the range of about 5 to about 20 percent by weight based on total weight of the blend.

7. A polymer blend according to claim 5 wherein the chain extender employed as reactant (ii) in the preparation of the polyurethane component (b) is 1,6-hexanediol.

8. A polymer blend according to claim 5 wherein the chain extender employed as reactant (ii) in the preparation of the polyurethane component (b) is 1,4-cyclohexanedimethanol.

* * * * *

UNITED STATES PATENT AND TRADEMARK OFFICE
CERTIFICATE OF CORRECTION

PATENT NO. : 4,567,236

DATED : January 28, 1986

INVENTOR(S) : David J. Goldwasser and Richard W. Oertel III

It is certified that error appears in the above-identified patent and that said Letters Patent is hereby corrected as shown below:

Title page:

Under the Assignee section [73] "The Upjohn Company" should read -- The Dow Chemical Company --.

Signed and Sealed this

Tenth Day of March, 1987

Attest:

DONALD J. QUIGG

*Attesting Officer*   *Commissioner of Patents and Trademarks*